United States Patent [19]
Kusano

[11] Patent Number: 5,477,534
[45] Date of Patent: Dec. 19, 1995

[54] ACOUSTIC ECHO CANCELLER

[75] Inventor: Yoshimasa Kusano, Kyoto, Japan

[73] Assignee: Kyocera Corporation, Kyoto, Japan

[21] Appl. No.: 278,375

[22] Filed: Jul. 20, 1994

[30]  Foreign Application Priority Data

| Jul. 30, 1993 | [JP] | Japan | 5-189701 |
| Nov. 30, 1993 | [JP] | Japan | 5-299375 |
| Dec. 24, 1993 | [JP] | Japan | 5-327518 |
| May 30, 1994 | [JP] | Japan | 6-116990 |

[51] Int. Cl.$^6$ ............................. H04B 3/23
[52] U.S. Cl. ........................... 370/32.1; 379/410
[58] Field of Search .......... 370/32.1, 32; 379/410, 379/406, 411, 407, 345; 364/724.19, 724.16

[56] References Cited

U.S. PATENT DOCUMENTS

| 4,817,081 | 3/1989 | Wouda et al. | 370/32.1 |
| 4,894,820 | 1/1990 | Miyamoto et al. | 370/32.1 |
| 5,151,937 | 9/1992 | Chujo et al. | 370/32.1 |
| 5,263,020 | 9/1993 | Yatsuzuka et al. | 370/32.1 |
| 5,289,539 | 2/1994 | Maruyama | 370/32.1 |
| 5,315,585 | 5/1994 | Iizuka et al. | 370/32.1 |

FOREIGN PATENT DOCUMENTS 63-246934  10/1988  Japan .

OTHER PUBLICATIONS

Noda, Atsuhiko, et al., "A Learning Method For System Identification", Measurement and Control, vol. 7, No. 9 (1968), pp. 597–605.

Makino, Shoji, et al., "Improvement On Adaptation Of an Echo Cancellar In A Room", Electronics Communication Society, Technical Report, EA89-3, (1989), pp. 15–21.

Primary Examiner—Douglas W. Olms
Assistant Examiner—Ajit Patel
Attorney, Agent, or Firm—Spensley Horn Jubas & Lubitz

[57]  ABSTRACT

An acoustic echo canceller for cancelling an acoustic echo component produced when a signal on a receiving communication line appears on a transmitting communication line via an acoustic echo path. In the acoustic echo canceller, a variable coefficient series is divided into blocks, among which selected is a block requiring a coefficient correction amount update operation conforming to the attenuation characteristic of an impulse response in a sound field. A coefficient fitted to the attenuation characteristic of the impulse response in the sound field is set for the selected block. Therefore, convergence speed degradation of the acoustic echo cancellation characteristic involved in divided update can be compensated, and even if an echo path characteristic fluctuates, an excellent follow-up characteristic is provided, so that stable and high-speed acoustic echo cancellation can always be executed.

10 Claims, 11 Drawing Sheets

ERLE vs STEP

| S1 | S2 | S3 | |
|---|---|---|---|
| 0 | 0 | 0 | → MODEL1 |
| 0 | 0 | 1 | |
| 0 | 1 | 0 | |
| 0 | 1 | 1 | |
| 1 | 0 | 0 | → MODEL2 |
| 1 | 0 | 1 | |
| 1 | 1 | 0 | |
| 1 | 1 | 1 | → MODEL3 |

ACOUSTIC ECHO CANCELLER

BACKGROUND OF THE INVENTION

1. Field of the Invention

This invention relates to an acoustic echo canceller for use with communication lines, indoor sound field controllers, and high-quality speech communication conference systems, and for cancelling an acoustic echo component produced when a signal on a receiving communication line appears on a transmitting communication line via an acoustic echo path.

2. Description of the Related Art

Generally, the acoustic echo cancellers are roughly classified into those for cancelling an echo produced due to an impedance mismatch of a 2-wire 4-wire converter on long-distance telephone lines using a communication satellite and submarine cables and those for cancelling an echo produced due to acoustic coupling of speaker speech at a loudspeaking telephone set in a TV conference system, etc., each of which includes a correction amount calculation circuit, a variable coefficient filter for generating an artificial acoustic echo, and a subtractor. The basic operation of the acoustic echo canceller will be described hereinafter.

FIG. 1 shows the basic configuration of an acoustic echo canceller. A receive signal input terminal 1 is connected to a receive signal output terminal 2 and a receive signal at the receive signal input terminal 1 is branched to a variable coefficient digital filter 3 for generating an artificial echo. A transmit signal from a transmit signal input terminal 4 and the artificial acoustic echo which is an output of the variable coefficient digital filter 3 are input to a subtractor 5 for cancelling the acoustic echo component in the transmit signal. An output of the subtractor 5 is sent to a transmit signal output terminal 6. An output of the transmit signal output terminal 6 and the signal at the receive signal input terminal 1 are input to a correction amount calculation circuit 7. The filter coefficient of the variable coefficient digital filter 3 is corrected in response to an output of the correction amount calculation circuit 7. In the variable coefficient digital filter 3, the receive signal is input to a receive signal input register 8 and a sum-of-products operation on the receive signal in the receive signal input register 8 and an artificial impulse response in an artificial impulse response register 9 is performed by a sum-of-products operation circuit 10. The result of the sum-of-products operation circuit 10 is output as an artificial acoustic echo. The receive signal output terminal 2 and the transmit signal input terminal 4 are connected to a 2-wire 4-wire converter on a long-distance telephone line or connected to a loudspeaker and a microphone in a loudspeaking telephone system.

Assume that the signal propagation characteristic of an acoustic echo path can be represented as a linear form and by an FIR type digital filter. Let its impulse response be $h(t)$, input receive signal be $x(t)$, and sampling time interval be T. Acoustic echo at time kT, $y_k$, is represented as follows:

$$Y_k = h_k' x_k \quad (1)$$

where $$h = [h_1, h_2, \ldots, h_n]'$$
$$x = [x_{k-1}, \ldots, x_{k-n}]' \quad (2)$$

': Inversion of vector

On the other hand, assuming that an estimated value of h at time kT is $hs_k$, an estimated value of $y_k$, $ys_k$ is given as follows:

$$ys_k = hs_k' x_k \quad (3)$$

When a speech signal exists at the receive signal input terminal 1 and only an acoustic echo with no speech signal exists at the transmit signal input terminal 4, the acoustic echo canceller performs echo cancel operation as an adaptive operation state. Generally, a learning method for identification ("A Learning Method for System Identification" by Atuhiko NODA and Jin-ichi NAGUMO, Measurement and Control, Vol. 7, No. 9, pp. 597–605 (1968)) is adopted as an algorithm of the adaptive operation. Sequential correction of $hs_k$ by the learning method for identification is performed according to $$hs_{k+1} = hs_k + \alpha(x_k e_k)/x_k' x_k \quad (4)$$

where $$e_k = y_k - ys_k, \quad 0 < \alpha \leq 1 \quad (5)$$

$e_k$ is called a remaining acoustic echo. Such calculation operation is performed in the coefficient correction amount calculation circuit 7. A variable coefficient series $hs_k$ is stored in the artificial impulse response register 9. $\alpha$ is a correction loop gain for determining sensibility of estimation; the nearer to 1.0 the value, the greater given the correction amount, enabling an acoustic echo to be cancelled at a high speed. However, for actual use, the value must be changed depending on near-end noise and the line state. It is common practice to determine the correction loop gain $\alpha$ according to a rule of thumb at present.

When the acoustic echo characteristic in a loudspeaking sound field is represented by such FIR type digital filter, a large configuration of several hundreds to several thousands of taps results and the operation amount involved in updating the correction amount of the variable coefficient series $hs_k$ becomes enormous and cannot be covered by a small-scaled hardware. Thus, the variable coefficient series $hs_k$ is divided into several stages for processing and the operation amount for updating in one step is reduced (for example, Japanese Patent Unexamined Publication No. Sho. 63-246934). As an example, FIG. 2 shows the acoustic echo cancellation characteristic with an autoregressive signal as an input when 2-division processing is performed for the variable coefficient series divided into first and latter halves. For comparison, a case where no division processing is performed is also shown. In the figure, "ERLE" is short for echo return loss enhancement. Assuming that the total of variable coefficient series is N, the division contents become as follows:

$hs1_k$: 0 to N/2
$hs2_k$: N/2+1 to N

By applying the above-mentioned division range, from expression (4), update algorithm can be represented as $$hs1_{k+1} = hs1_k + \alpha(x_k e_k)/x_k' x_k \quad (6)$$

$$hs2_{k+1} = hs2_k + \alpha(x_k e_k)/x_k' x_k \quad (7)$$

which is an adaptive algorithm for updating all variable coefficient series $hs_k$ at M of two or in two steps (where M is the number of steps for updating all the coefficient series). Therefore, the operation amount in one step can be reduced to a half; of course, if the division count N is increased, the operation amount can be reduced to 1/N accordingly.

If processing of updating the correction amount of variable coefficient series $hs_k$ is performed with division, the operation amount involved in the updating is reduced, but the variable coefficient not updated in one step causes an estimation error to occur on generation of an artificial acoustic echo; resultantly, the remaining echo increases and the acoustic echo cancellation characteristic is degraded. As shown in FIG. 2, as compared with processing in which all variable coefficients are updated at a time, the updating processing with division requires about double time until saturation, and the convergence speed lowers to a half. When the convergence speed lowers, the remaining echo at a large level exists on the line, causing the communication state to be degraded. Also, if a path fluctuation occurs on the echo path during talking, the follow-up characteristic to that state worsens and the acoustic echo cancellation characteristic changes rapidly, causing rasping remaining voice to occur, so that high-accuracy and high-quality acoustic echo cancellation cannot be performed.

SUMMARY OF THE INVENTION

It is therefore an object of the invention to provide an acoustic echo canceller which compensates degradation of the convergence speed involved in updating the coefficient correction amount with division and improves in stability of two-way communication detection.

It is another object of the invention to provide an acoustic echo canceller which is excellent in operation stability, has a high follow-up characteristic to acoustic echo path fluctuation, provides a high-speed acoustic echo cancellation characteristic, and always maintains a large acoustic echo cancellation amount for performing acoustic echo control in a sound field.

To these ends, according to the invention, there is provided an acoustic echo canceller including a receive signal input terminal, a receive signal output terminal connected to the receive signal input terminal, a transmit signal input terminal, a transmit signal output terminal, a variable coefficient digital filter for generating an artificial echo signal in response to a receive signal input through the receive signal input terminal, a subtractor being located between the transmit signal input terminal and the transmit signal output terminal for finding a difference between an echo signal from the transmit signal input terminal and the artificial echo signal generated by the variable coefficient digital filter, a coefficient correction amount calculation circuit, to which the receive signal from the receive signal input terminal and the difference from the subtractor are supplied, for performing division processing in which a coefficient series of the variable coefficient digital filter is divided into N blocks for automatically updating the entire coefficient series in M steps, and a coefficient block selector for selecting a block to be updated among the N blocks of the coefficient series, wherein a coefficient correction amount fitted to an attenuation characteristic of an impulse response in a sound field is set for the block selected by the coefficient block selector.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

DETAILED DESCRIPTION OF THE PREFERRED EMBODIMENTS

Referring now to the accompanying drawings, there are shown preferred embodiments of the invention.

Figure 1:
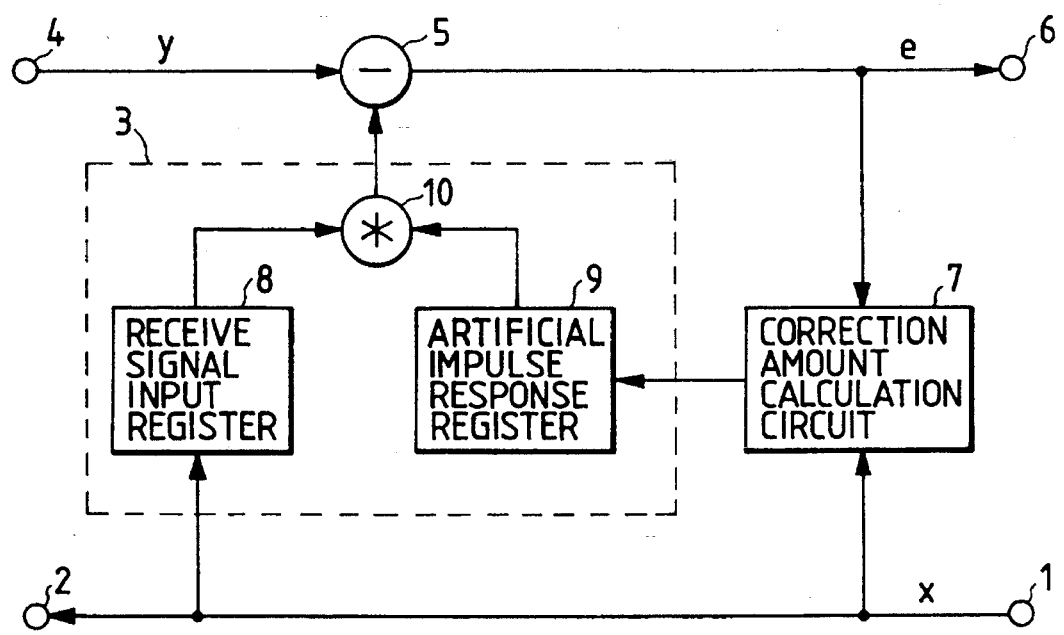
FIG. 1 is a block diagram showing the basic configuration of a conventional acoustic echo canceller using a general learning method for identification.
Figure 2:
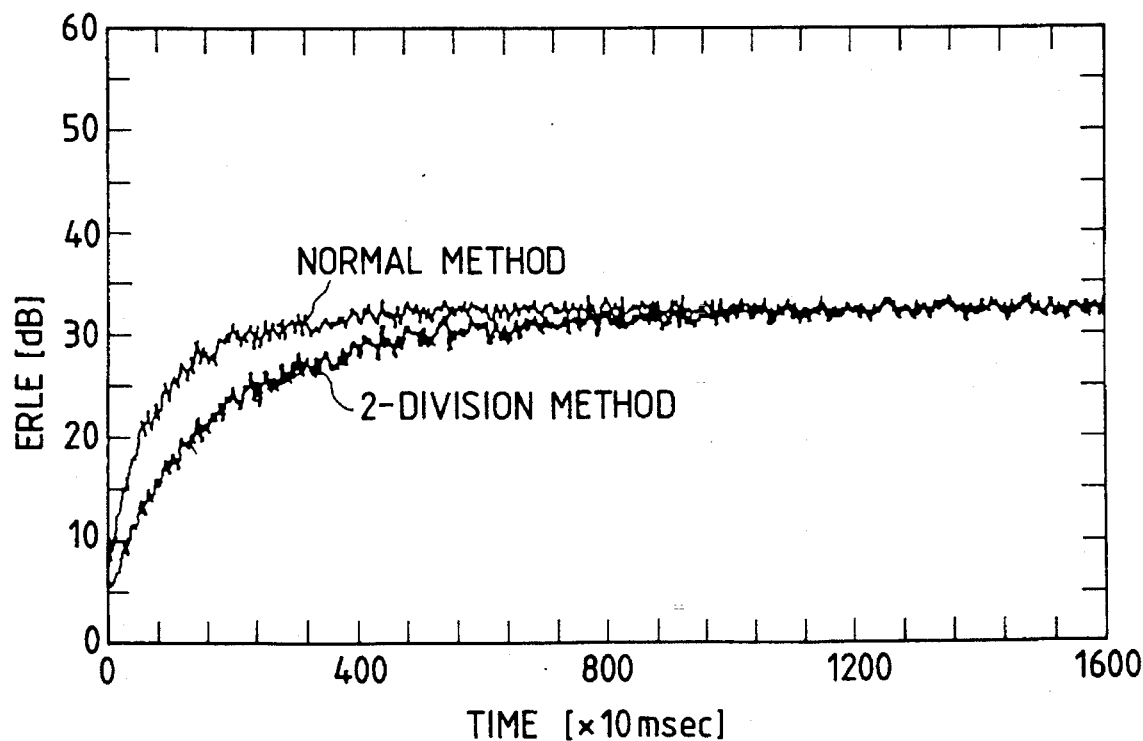
FIG. 2 is a graph showing an acoustic echo cancellation characteristic for an autoregressive signal when division processing is performed for a conventional coefficient correction amount update.
Figure 3:
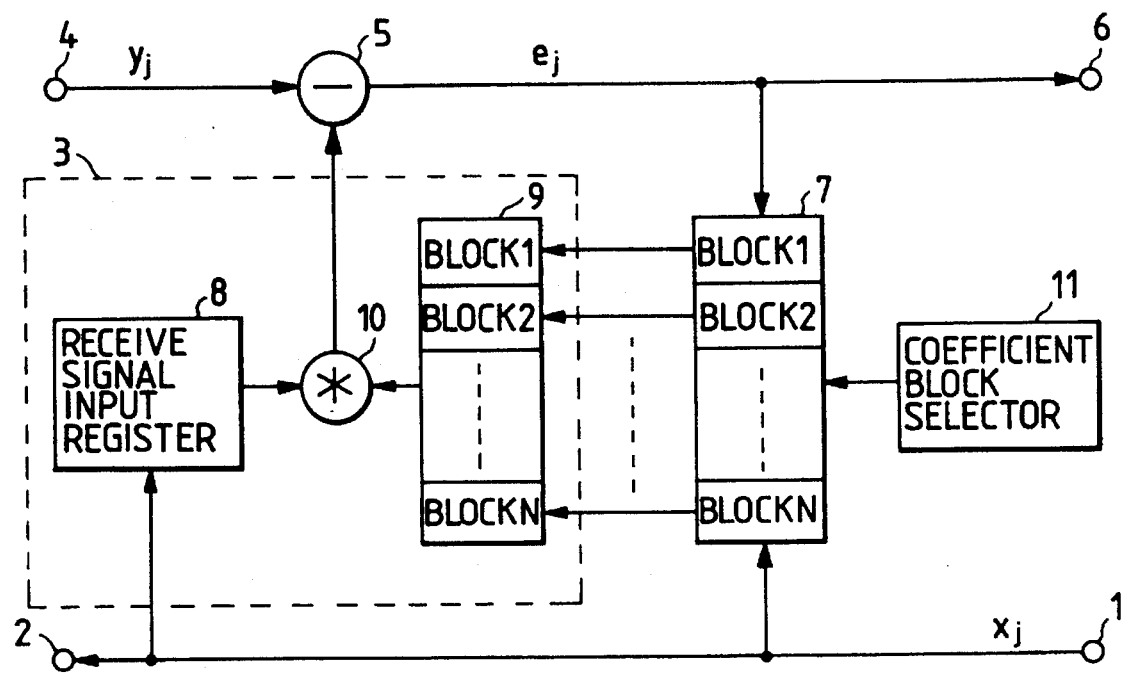
FIG. 3 is a block diagram showing the configuration of an acoustic echo canceller according to a first embodiment of the invention.

FIG. 3 is a block diagram showing the configuration of an acoustic echo canceller according to a first embodiment of the invention. As shown in FIG. 3, the acoustic echo canceller in the embodiment has a coefficient block selector 11 in addition to the same configuration as the conventional acoustic echo canceller including a receive signal input terminal 1, receive signal output terminal 2, variable coefficient digital filter 3, transmit signal input terminal 4, subtractor 5, transmit signal output terminal 6, coefficient correction amount calculation circuit 7, receive signal input register 8, artificial impulse response register 9, and sum-of-products operation circuit 10 and adopting the learning method for identification as an adaptive algorithm.

That is, the acoustic echo canceller in the first embodiment includes the receive signal input terminal 1, transmit signal output terminal 6, receive signal output terminal 2 for sending a receive signal arriving at the receive signal input terminal 1 to an unknown acoustic echo path, transmit signal input terminal 4 for collecting the signal sent from the receive signal output terminal 2 and an echo responding to the receive signal, artificial impulse response register 9 which stores coefficient series of an adaptive digital filter, sum-of-products operation circuit 10 for performing a convolution integral operation on the contents of the artificial impulse response register 9 and the contents of the receive signal input register 8 which stores the receive signal, subtractor 5 for calculating the difference between the echo and an artificial echo generated by the sum-of-products operation circuit 10, and coefficient correction amount calculation circuit 7 for performing processing so that the coefficient series in the artificial impulse response register 9 is automatically updated so that the adaptive digital filter supplies an approximate value of the echo. The added coefficient block selector 11 is provided for dividing the artificial impulse response register 9 into a plurality of blocks and selecting one of the blocks in sequence for performing coefficient update operation, thereby performing division processing of updating the coefficient correction amount fitted to the impulse response attenuation characteristic in a sound field.

Figure 4:
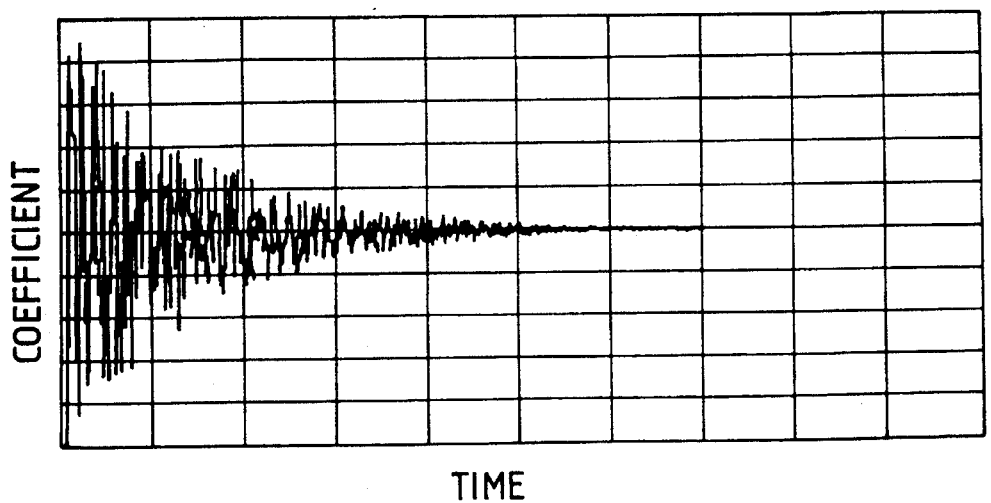
FIG. 4 is a graph showing an example of an impulse response characteristic in a sound field.
Figure 5:
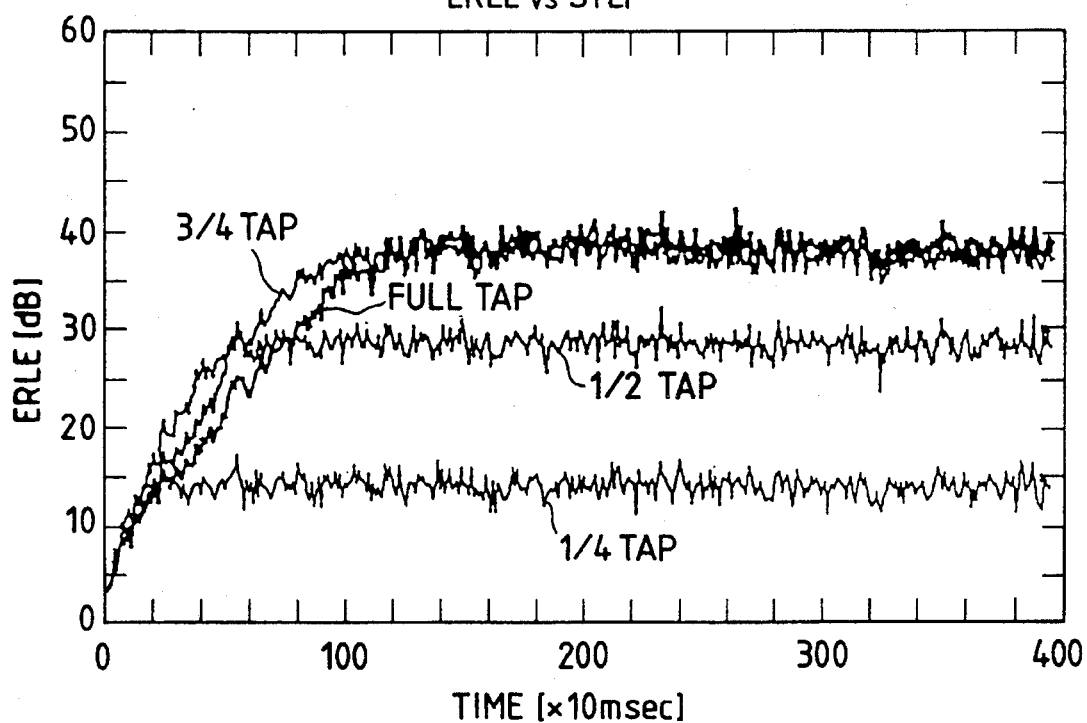
FIG. 5 is a graph showing an acoustic echo cancellation characteristic.
Figure 6:
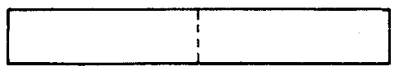
FIG. 6 is a diagram showing an example of a weighted division processing procedure in the first embodiment.
Figure 6:
Figure 6:
Figure 6:

It is known that the impulse response in a sound field presents an attenuation characteristic in which the coefficient amplitude lowers with the time, as shown in FIG. 4 (for example, "Improvement on Adaptation of an Echo Canceller in a Room" by Shoji MAKINO and Nobuo KOIZUMI, Electronics Communication Society, Technical Report, EA89-3 (1989)). Which part of the attenuation process of the impulse response contributes to the acoustic echo cancellation characteristic in what degree was checked. The result is shown as the cancellation characteristic in FIG. 5. The order N of a variable coefficient series was fixed in the following manner 1) 0-N (full tap)
2) 0-3N/4 (¾ tap)
3) 0-N/2 (½ tap)
4) 0-N/4 (¼ tap)

and acoustic echo cancellation operation was performed for a white noise signal. As a result, if the first half of the variable coefficient series, namely, the portion of large impulse response coefficient power is identified, cancellation amount of about 70% of that when all the taps are updated is obtained and the start-up time becomes faster than that when all the taps are updated. Therefore, in division processing, the blocks are also weighted and the coefficient correction amount is updated intensively in low-order portions of the variable coefficient series. FIG. 6 shows an example where the variable coefficient series is divided into four blocks to make three pairs, each of which consists of two blocks, and N/2 tap update operation is performed in one step for updating the full tap in four steps. Block 1 is updated in all steps 1–4, block 2 is updated in steps 1 and 3, block 3 is updated in step 2, and block 4 is updated in step 4. In other words, block 1 is updated every time, block 2 is updated twice every four times (once every twice), and blocks 3 and 4 are updated each once every four times.

Figure 7:
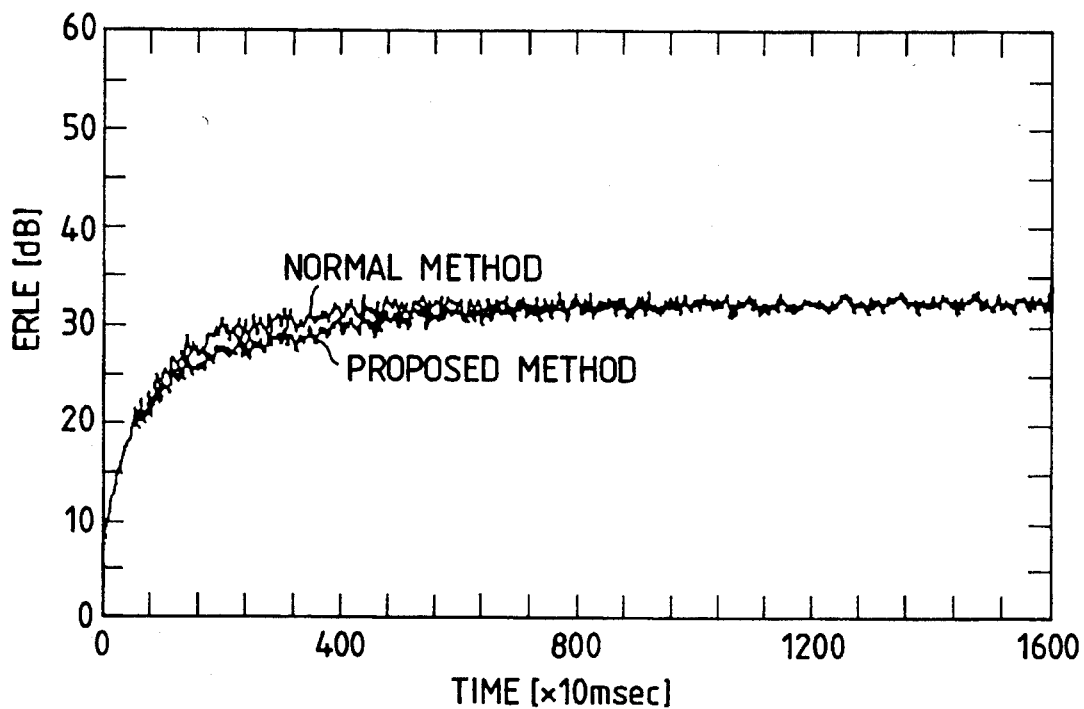
FIG. 7 is a graph showing an acoustic echo cancellation characteristic for an autoregressive signal.

FIG. 7 is a graph showing the acoustic echo cancellation characteristic when an autoregressive signal is used. As a result of performing weighted division processing (proposed method), substantially equal performance to that of the system of updating all the taps of the variable coefficient series (normal method) can be provided.

As discussed in detail, according to the first embodiment of the invention, the following excellent effects can be expected.

(1) Since degradation of the convergence speed of the acoustic echo cancellation characteristic due to division processing of updating the coefficient correction amount can be corrected, the acoustic echo can be cancelled at a high speed.

(2) Since the internal operation amount of the adaptive algorithm can be reduced drastically without degrading the acoustic echo cancellation performance, the hardware is provided as a small-scaled configuration.

(3) Fluctuation of the echo path characteristic is caused by a spacial move of human bodies and objects approaching a microphone or a loudspeaker. That is, in the invention for intensively updating low-order taps of impulse response, the follow-up characteristic to echo path fluctuation is very excellent and communication lines can be placed in the stationary state rapidly.

(4) The operation amount related to updating a variable coefficient series can be reduced to a half or less while the high quality of communication lines can be provided.

(5) Since portions with large coefficients are identified preferentially, the semi-stationary state is held and remaining echo signal at a comparatively large level does not exist on the communication line, so that two-way communication detection can be made easily and speech degradation such that the head of transmit voice is cut is eliminated, ensuring the high sound quality.

Figure 8:
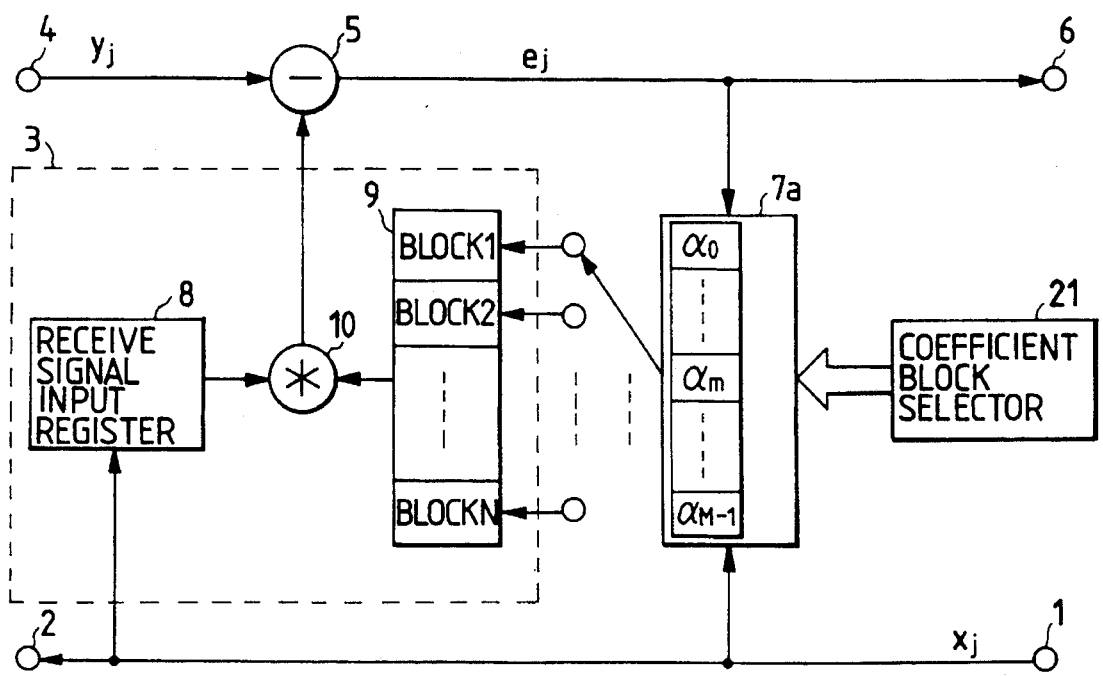
FIG. 8 is a block diagram showing the configuration of an acoustic echo canceller according to a second embodiment of the invention.

FIG. 8 is a block diagram showing the configuration of an acoustic echo canceller according to a second embodiment of the invention. As shown in FIG. 8, the acoustic echo canceller in the embodiment includes a receive signal input terminal 1, receive signal output terminal 2, variable coefficient digital filter 3, transmit signal input terminal 4, subtractor 5, transmit signal output terminal 6, coefficient correction amount calculation circuit 7a, receive signal input register 8, artificial impulse response register 9, sum-of-products operation circuit 10, and coefficient block selector 21.

That is, the acoustic echo canceller in the second embodiment includes the receive signal input terminal 1, receive signal output terminal 2, transmit signal input terminal 4, transmit signal output terminal 6, variable coefficient digital filter 3 to which a receive signal input through the receive signal input terminal 1 is input, artificial impulse response register 9 which stores coefficient series of the variable coefficient digital filter 3, sum-of-products operation circuit 10 for performing a convolution integral operation on the contents of the artificial impulse response register 9 and the input signal through the receive signal input terminal 1, subtractor 5 for calculating the difference between an artificial echo generated by the sum-of-products operation circuit 10 and an acoustic echo input through the transmit signal input terminal 4, coefficient correction amount calculation circuit 7a for applying a correction amount to the coefficient series in the artificial impulse response register 9 so that the variable coefficient digital filter 3 supplies an approximate value of the acoustic echo, and coefficient block selector 21 for sending an instruction for selecting one of blocks in sequence for performing coefficient update operation to the coefficient correction amount calculation circuit 7a so that the coefficient series in the artificial impulse response register 9 is divided into N blocks for automatically updating the entire coefficient series in a total of M steps.

When the coefficient series stored in the artificial impulse response register 9 is divided into N blocks and the entire coefficient series is updated in M steps, a large interpolation loop gain $\alpha_0$ interpolated into the coefficient correction amount calculation circuit 7a is applied to blocks for which high update frequency is set so that the blocks are to be updated every time and an extremely small interpolation correction loop gain $\alpha_{M-1}$ is applied to blocks for which low update frequency is set so that the blocks are to be updated once every M times. An interpolation correction loop gain $\alpha_m$ smaller than the interpolation correction loop gain $\alpha_0$ set in the blocks updated every time and larger than the interpolation correction loop gain $\alpha_{M-1}$ set in the blocks updated once every M times is applied to the n-th block for which update frequency is set so that the n-th block is to be updated twice to less than M times every M times.

The relationship in value among the interpolation correction loop gains can be represented as follows:

$$0 < \alpha_{M-1} < \ldots < \alpha_m < \ldots < \alpha_0 \leq 1 \qquad (8)$$

If a sequential update algorithm is formed using the interpolation correction loop gains, it can be shown as expression (9) from expression (4):

$$hs1_{k+1} = hs1_k + \alpha_0 (x_k e_k)/x_k' x_k$$

$$hsn_{k+1} = hsn_k + \alpha_m (x_k e_k)/x_k' x_k$$

$$hsN_{k+1} = hsN_k + \alpha_{M-1} (x_k e_k)/x_k' x_k \qquad (9)$$

where $1 < n < N$. If variable coefficient series matrix hsn (n=1, 2, ..., N) of N blocks in the sequential update algorithm shown in expression (9) is arranged in the update frequency ascending order of the blocks, it can be shown as expression (10):

$$hsN < \ldots < hsn < \ldots < hs1 \qquad (10)$$

Of course, the blocks may become the same in update frequency depending on setup scheduling of divided update. In such a case, whether or not the interpolation correction loop gain of the same value is to be adopted may be determined in response to operation characteristics.

In the embodiment, division processing of updating the coefficient correction amount is performed using each interpolation correction loop gain stored in the coefficient correction amount calculation circuit 7a conforming to the setup update frequencies under the above-mentioned conditions.

Figure 9:
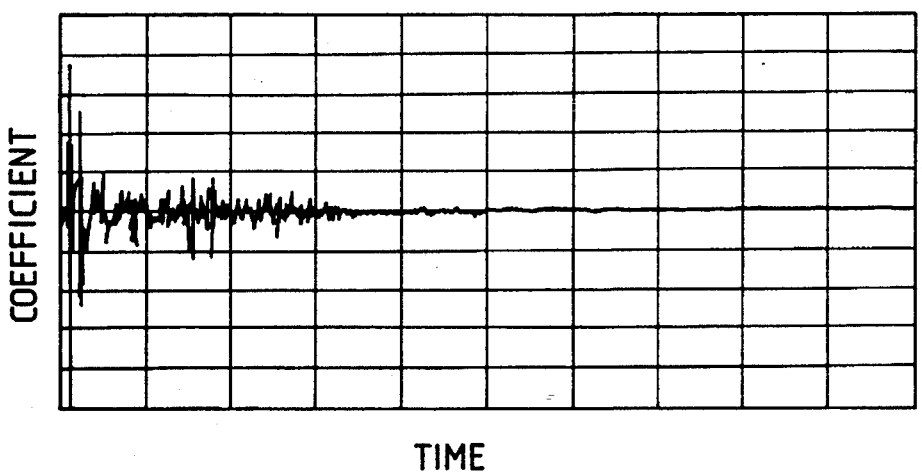
FIG. 9 is a graph showing an example of coefficient series stored in an artificial impulse response register in the case of using an adaptive interpolation correction loop gain.
Figure 10:
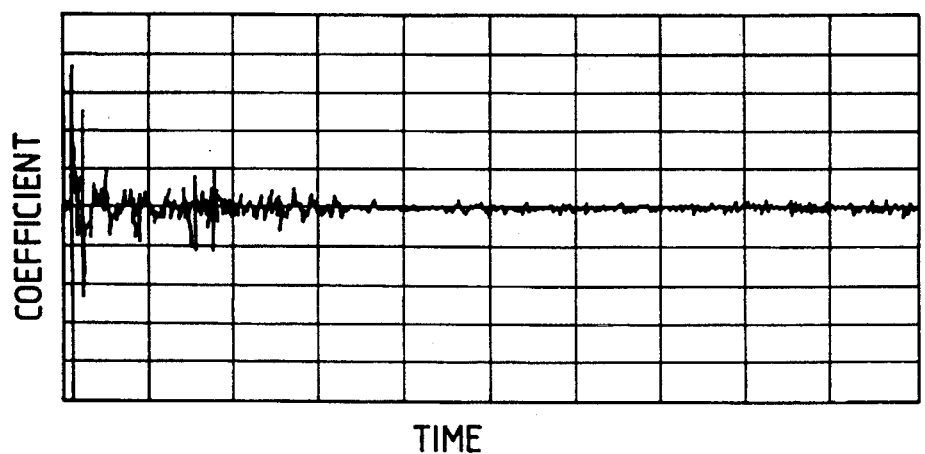
FIG. 10 is a graph showing an example of coefficient series stored in an artificial impulse response register in the case of using a fixed interpolation correction loop gain.
Figure 11:
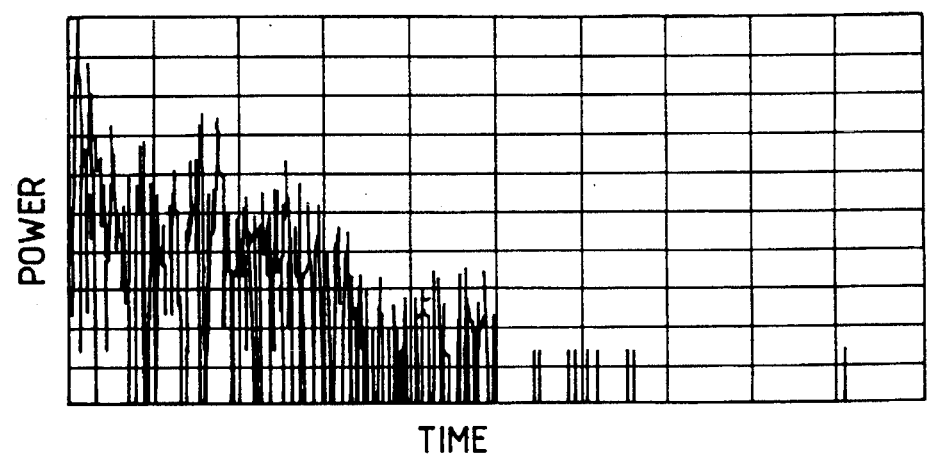
FIG. 11 is a graph showing an example of power of coefficient series corresponding to FIG. 9.
Figure 12:
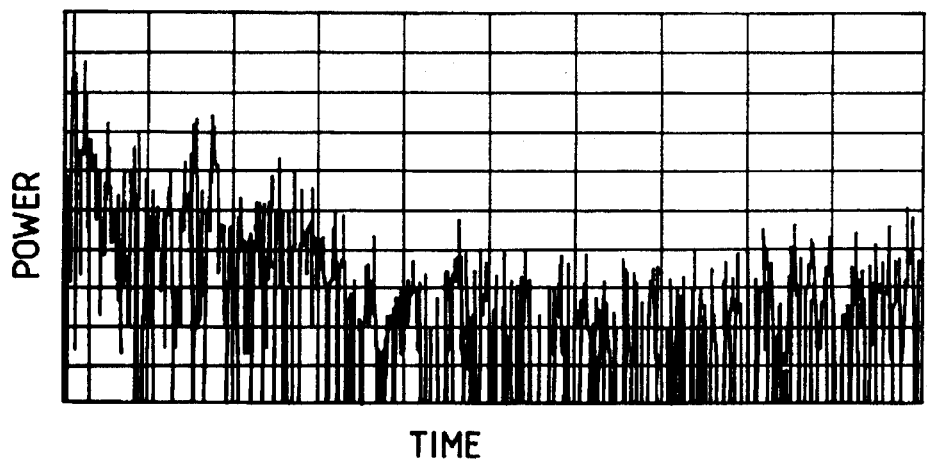
FIG. 12 is a graph showing an example of power of coefficient series corresponding to FIG. 10.

FIGS. 9 and 10 show the observation results of coefficient series in the artificial impulse response register 9 in which an interpolation correction loop gain is set conforming to the update frequency of division processing according to this embodiment and in the register in which a fixed interpolation correction loop gain is set. The result of using the adaptive interpolation correction loop gain according to this embodiment in FIG. 9 indicates that the impulse response presents an attenuation characteristic, while the result of using the fixed interpolation loop gain in FIG. 10 indicates that the coefficient portion of the long delay time has a large value and the impulse response does not present an attenuation characteristic as a whole. The impulse responses are observed in the same step on simulation by inputting the same reference signal. FIGS. 11 and 12 show the results of finding power in FIGS. 9 and 10 respectively. The result of adopting the fixed interpolation correction loop gain in FIG. 12 shows that power is distributed throughout the coefficient series. The power distribution of impulse response in an actual sound field becomes one where the coefficient power in a long delay time portion as shown in FIG. 11 is extremely small as compared with the coefficient power in a short delay time portion. This fact also shows that the invention is effective in division processing in which intermittent update is executed.

Figure 13:
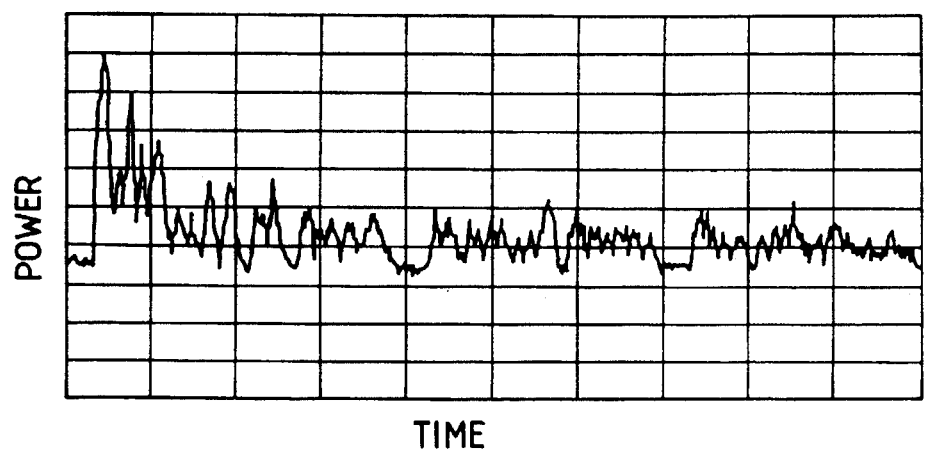
FIG. 13 is a graph showing an example of error signal power transition when voice of a woman is used as a reference signal in the case of using an adaptive interpolation correction loop gain.
Figure 14:
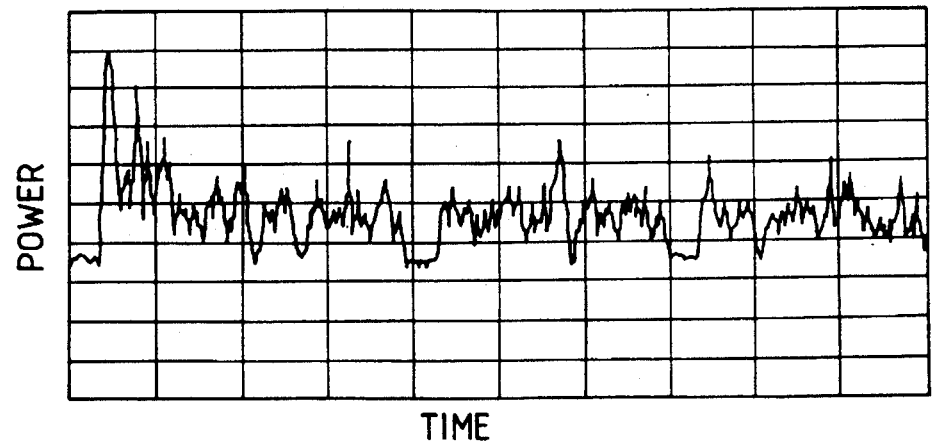
FIG. 14 is a graph showing an example of error signal power transition when voice of a woman is used as a reference signal in the case of using a fixed interpolation correction loop gain.

FIGS. 13 and 14 show the results of observing power displacement of error signal when actual voice of a woman is input as a reference signal. The result of adopting the adaptive interpolation correction loop gain shown in FIG. 13 indicates that the error signal, namely, acoustic echo is attenuated conscientiously, but the result of adopting the fixed interpolation correction loop gain in FIG. 14 shows that error signal power is large and that erroneous cancellation occurs. The result shown in FIG. 14 is a very rasping reverberation sound aurally.

Thus, according to the second embodiment of the invention, the following effects are produced.

(1) Since degradation of the convergence speed of the acoustic echo cancellation characteristic due to division processing of updating the coefficient correction amount can be corrected, the acoustic echo can be cancelled at a high speed.

(2) Since the internal operation amount of the adaptive algorithm can be reduced drastically without degrading the acoustic echo cancellation performance, the hardware can be provided as a small-scaled configuration and costs can be reduced.

(3) Fluctuation of the echo path characteristic is caused by a spacial move of human bodies and objects approaching a microphone or a loudspeaker. That is, in the invention for raising the update frequency of low-order taps of impulse response and adapting large interpolation correction loop gains, the start-up speed of the acoustic echo cancellation characteristic is fast, thus the follow-up characteristic to echo path fluctuation is very excellent and communication lines can be placed in the stationary state rapidly.

(4) The operation amount related to updating a variable coefficient series can be reduced to a half or less while the high quality of communication lines can be provided.

(5) Since amplitude fluctuation of error signal due to erroneous cancellation scarcely occurs, the semi-stationary state is held and remaining echo signal at a comparatively large level does not exist on the communication line, so that two-way communication detection can be made easily and speech degradation such that the head of transmit voice is cut is eliminated, ensuring the high sound quality.

Figure 15:
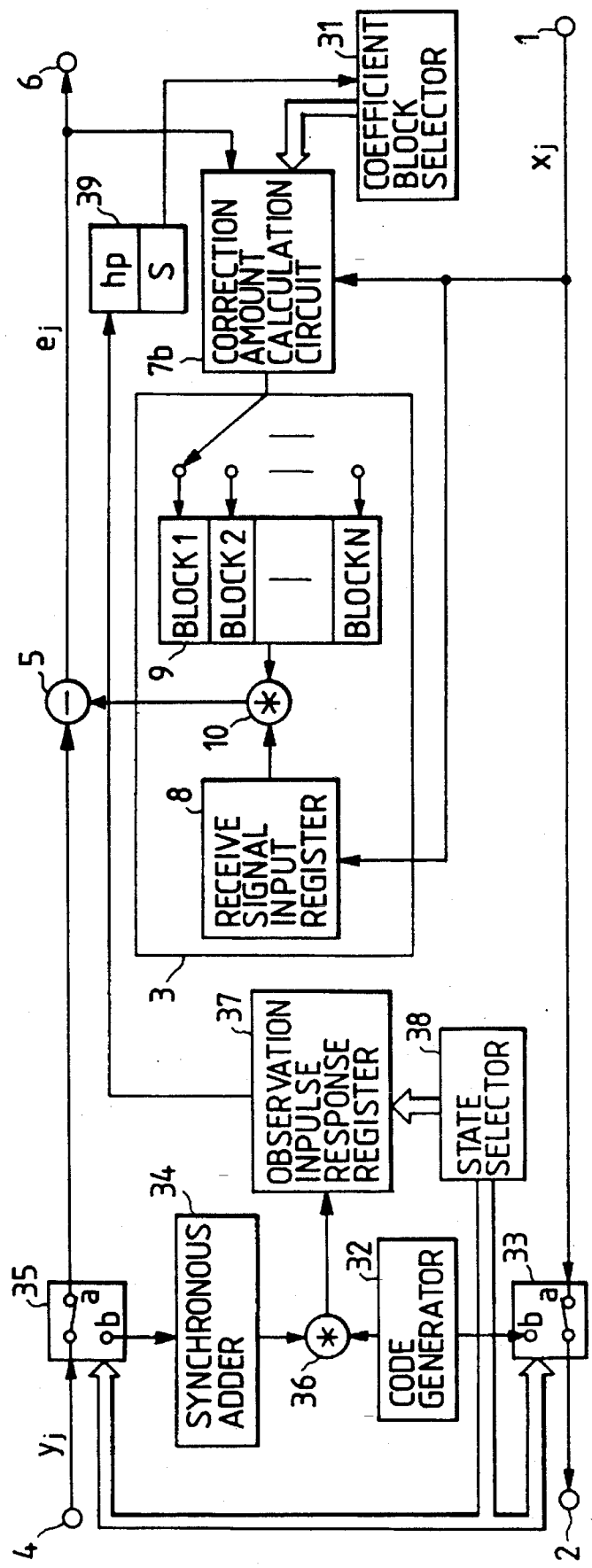
FIG. 15 is a block diagram showing the configuration of an acoustic echo canceller according to a third embodiment of the invention.

FIG. 15 is a block diagram showing the configuration of an acoustic echo canceller according to a third embodiment of the invention. As shown in FIG. 15, the acoustic echo canceller in the embodiment includes a receive signal input terminal 1, receive signal output terminal 2, variable coefficient digital filter 3, transmit signal input terminal 4, subtractor 5, transmit signal output terminal 6, coefficient correction amount calculation circuit 7b, receive signal input register 8, artificial impulse response register 9, sum-of-products operation circuit 10, coefficient block selector 31, code generator 32, first selection switch 33, synchronous adder 34, second selection switch 35, linear convolution integral operation circuit 36, observation impulse response register 37, state selector 38, and block power evaluation circuit 39.

That is, the acoustic echo canceller in the third embodiment includes the receive signal input terminal 1, receive signal output terminal 2, transmit signal input terminal 4, transmit signal output terminal 6, variable coefficient digital filter 3 to which a receive signal input through the receive signal input terminal 1 is input, artificial impulse response register 9 which stores coefficient series of the variable coefficient digital filter 3, sum-of-products operation circuit 10 for performing a convolution integral operation on the contents of the artificial impulse response register 9 and the input signal through the receive signal input terminal 1, subtractor 5 for calculating the difference between an artificial echo generated by the sum-of-products operation circuit 10 and an acoustic echo input through the transmit signal input terminal 4, coefficient correction amount calculation circuit 7b for applying a correction amount to the coefficient series in the artificial impulse response register 9 so that the variable coefficient digital filter 3 supplies an approximate value of the acoustic echo, and coefficient block selector 31 for sending an instruction for selecting one of blocks in sequence for performing coefficient update operation to the coefficient correction amount calculation circuit 7b so that the coefficient series in the artificial impulse response register 9 is divided into N blocks for automatically updating the entire coefficient series in a total of M steps.

The echo canceller further includes the code generator 32 for generating a series code having no correlation with the receive signal input through the receive signal input terminal 31, first selection switch 33 for outputting either the receive signal input to input terminal a or the series code input to input terminal b through the receive signal output terminal 2, synchronous adder 34 for calculating an impulse response of the series code input through the transmit signal input terminal 4 via the acoustic echo path, second selection switch for switching output terminals a and b in synchronization with the first selection switch 33, linear convolution integral operation circuit 36 for performing a convolution integral operation on an output of the synchronous adder 34 and the series code to calculate an impulse response of the acoustic echo path, observation impulse response register 37 which stores observation coefficient series of the impulse response output by the linear convolution integral operation circuit 36, state selector 38 for synchronously controlling the first and second selection switches 33 and 35 and issuing a discharge instruction of the impulse response coefficient series stored in the observation impulse response register 37, and block power evaluation circuit 39 for dividing the impulse response coefficient series discharged from the observation impulse response register 37 in response to the instruction of the state selector 38 into blocks corresponding to division blocks in the artificial impulse response register 9, calculating sum power hpn (n=1, 2, ..., N) in the blocks, and comparing the sum power hpn between the contiguous blocks.

Comparison of sum power hpn performed in the block power evaluation circuit 39 will be discussed by taking N=4 as an example.

$$hp1/hp2 = PD1$$

$$hp2/hp3 = PD2$$

$$hp3/hp4 = PD3 \quad (11)$$

Contiguous sum power ratios PD1, PD2, and PD3 calculated according to expression (11) are compared with interpolation thresholds S1, S2, and S3 set corresponding thereto. PD1 is compared with S1 for checking under the following conditions.

Condition 1: $PD1 \geq S1$

Condition 2: $PD1 < S1$

Figures 16, 19:
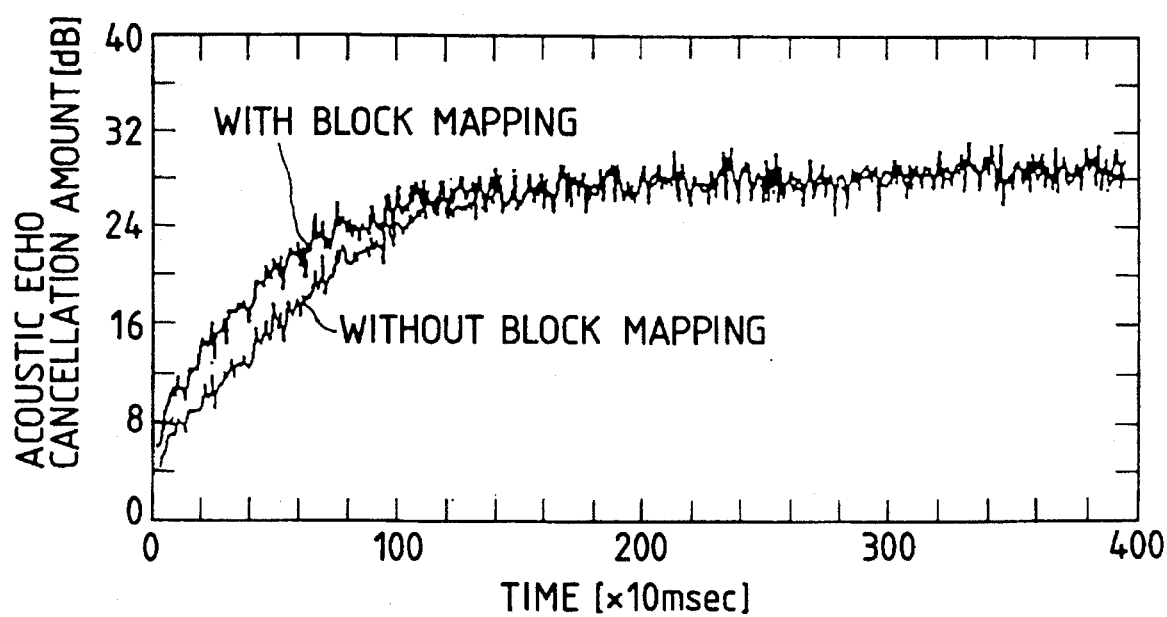
FIG. 16 is a diagram showing state evaluation combinations for determining divided update block mapping.
FIG. 19 is a graph showing an example of acoustic echo cancellation characteristics with white noise as a reference input.

When condition 1 is satisfied, "1" is returned; when condition 2 is satisfied, "0" is returned. Likewise, PD2 is compared with S2 and PD3 is compared with S3 for checking under the conditions. The correspondence between the states "1" and "0" and the interpolation thresholds S1, S2, and S3 is represented as shown in FIG. 16. Divided update block mapping with update frequencies changed conforming to the eight combinations in FIG. 16 may be interpolated into the coefficient block selector 31. However, not all impulse response characteristics corresponding to the eight combinations become different and similar ones exist. Here, as an example, impulse responses in a sound field are roughly classified into three types shown below for division processing. Therefore, divided update block mapping with three patterns is interpolated into the coefficient block selector 31:

model 1: hp1>hp2>hp3>hp4 model 2: hp1>hp2=hp3=hp4 model 3: hp1=hp2=hp3=hp4

The block sum power relationship is not strict and may be set by assuming that impulse responses in such state exist from measurement experience of impulse response observation test in a sound field, etc. Then, tile interpolation thresholds S1, S2, and S3 are determined from the relationship. Corresponding to the output state in FIG. 16, model 1 becomes [0, 0, 0], model 2 becomes [1, 0, 0], and model 3 becomes [1, 1, 1]. Other five combinations are set so as to be absorbed in any of the three combinations and the block power evaluation circuit 39 outputs the model numbers to the coefficient block selector 31.

In this embodiment, as described above, the update frequencies in the blocks in coefficient correction amount calculation of the coefficient correction amount calculation circuit 7b are changed in response to the comparison results made by the block power evaluation circuit 39 to perform divided update of the coefficient series.

Of course, as means for observing an impulse response in a sound field, a time prolonging pulse rather than the series code can also be used.

Figure 17:
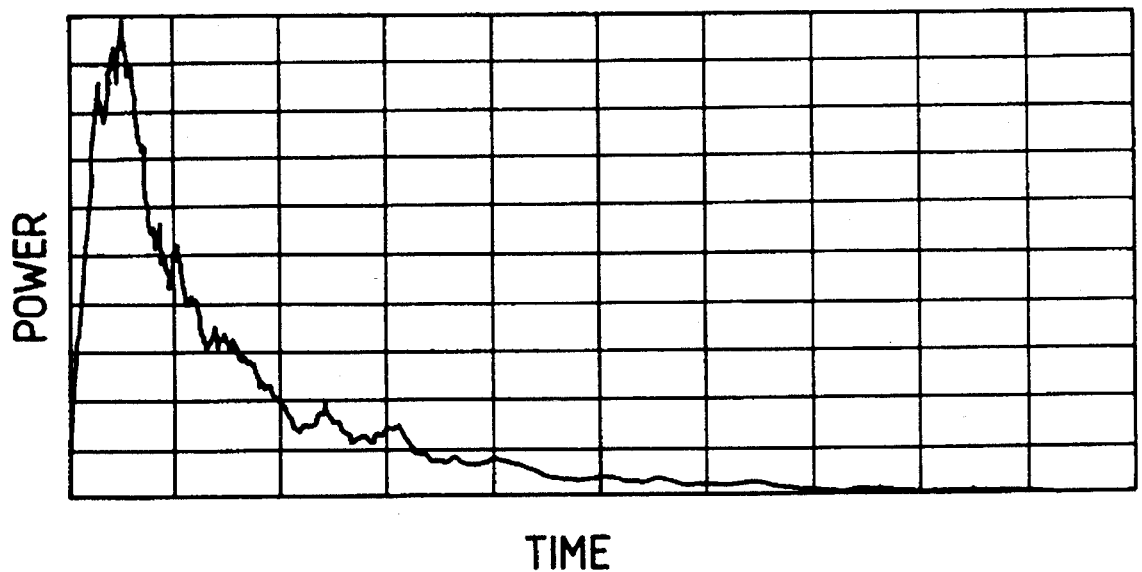
FIG. 17 is a graph showing an example of error signal running average power transition with white noise as a reference input in the case of using a divided update block mapping.
Figure 18:
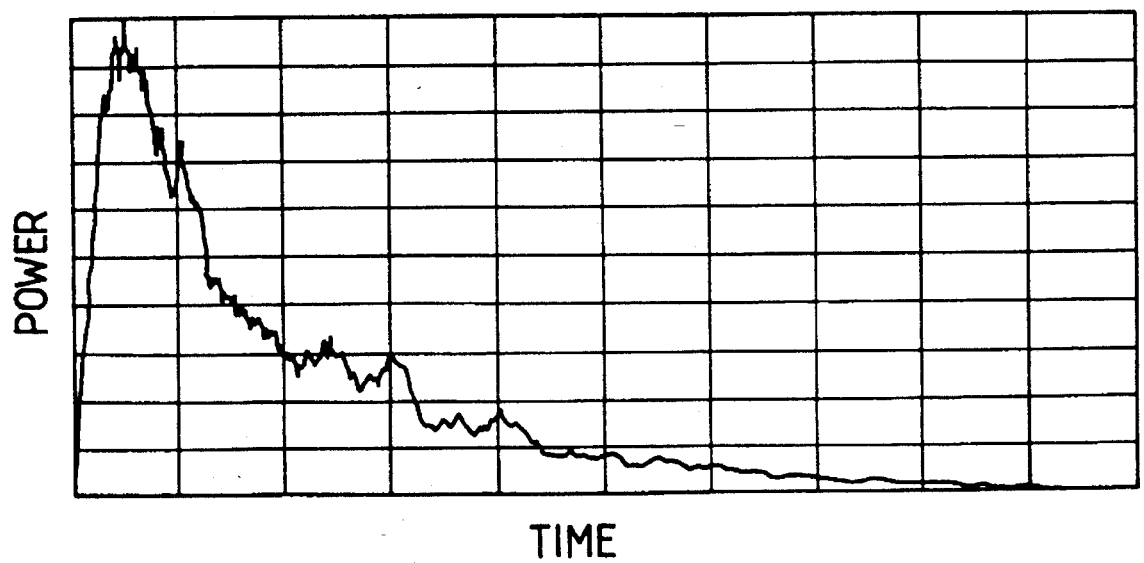
FIG. 18 is a graph showing an example of error signal running average power transition with white noise as a reference input without a divided update block mapping.

FIGS. 17 and 18 are graphs showing running average power of error signals observed when the system is driven with white noise as a reference signal. In the case of using no divided update block mapping as shown in FIG. 18, attenuation of the error signal is dull as compared with the result with proper divided update block mapping as shown in FIG. 17. The result also shows that it is advantageous to adopt divided update processing related to impulse response characteristics in a sound field.

FIG. 19 is a graph showing acoustic echo cancellation characteristics when the system is driven with white noise as a reference signal. The start-up speed at the initial cancellation stage in the system with divided update block mapping is approximately twice as fast as that in the system without divided update block mapping. The result also shows that the divided update system with block mapping is excellent.

As discussed in detail, according to the third embodiment of the invention, the following excellent effects can be expected.

(1) Since degradation of the convergence speed of the acoustic echo cancellation characteristic due to division processing of updating the coefficient correction amount can be corrected, the acoustic echo can be cancelled at a high speed.

(2) Since the internal operation amount of the adaptive algorithm can be reduced drastically without degrading the acoustic echo cancellation performance, the hardware can be provided as a small-scaled configuration and costs can be reduced.

(3) Fluctuation of the echo path characteristic is caused by a spacial move of human bodies and objects approaching a microphone or a loudspeaker. That is, in the invention for raising the update frequency of low-order taps of impulse response and adapting a large interpolation correction loop gain, the start-up speed of the acoustic echo cancellation characteristic is fast, thus the follow-up characteristic to echo path fluctuation is very excellent and communication lines can be placed in the stationary state rapidly.

(4) The operation amount related to updating a variable coefficient series can be reduced to a half or less while the high quality of communication lines can be provided.

(5) Since amplitude fluctuation of error signal due to erroneous cancellation scarcely occurs, the semi-stationary state is held and remaining echo signal at a comparatively large level does not exist on the communication line, so that high-speed two-way communication detection can be made easily and speech degradation such that the head of transmit voice is cut is eliminated, ensuring high sound quality.

Figure 20:
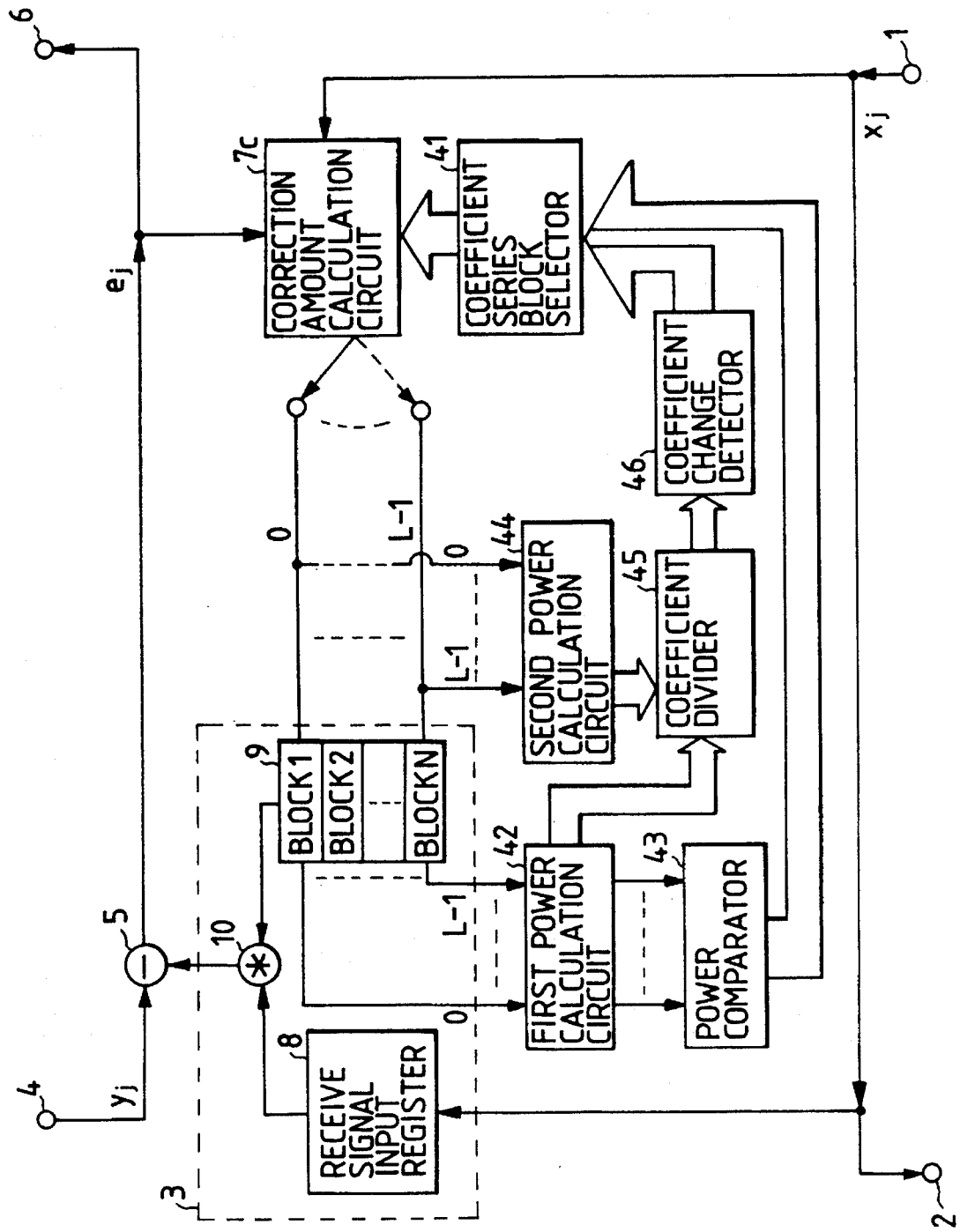
FIG. 20 is a block diagram showing the configuration of an acoustic echo canceller according to a fourth embodiment of the invention.

FIG. 20 is a block diagram showing the configuration of an acoustic echo canceller according to a fourth embodiment of the invention. As shown in FIG. 20, the acoustic echo canceller in the embodiment includes a receive signal input terminal 1, receive signal output terminal 2, variable coefficient digital filter 3, transmit signal input terminal 4, subtractor 5, transmit signal output terminal 6, coefficient correction amount calculation circuit 7c, receive signal input register 8, artificial impulse response register 9, sum-of-products operation circuit 10, coefficient series block selector 41, first power calculation circuit 42, power comparator 43, second power calculation circuit 44, coefficient divider 45, and coefficient change detector 46.

That is, the acoustic echo canceller in the fourth embodiment includes the receive signal input terminal 1, receive signal output terminal 2, transmit signal input terminal 4, transmit signal output terminal 6, variable coefficient digital filter 3 to which a receive signal input through the receive signal input terminal 1 is input, artificial impulse response register 9 which stores (L-1) coefficient series of the variable coefficient digital filter 3, sum-of-products operation circuit 10 for performing a convolution integral operation on the contents of the artificial impulse response register 9 and the input signal through the receive signal input terminal 1, subtractor 5 for calculating the difference between an artificial echo generated by the sum-of-products operation circuit 10 and an acoustic echo input through the transmit signal input terminal 4, coefficient correction amount calculation circuit 7c for applying a correction amount to the coefficient series in the artificial impulse response register 9 so that the variable coefficient digital filter 3 supplies an approximate value of the acoustic echo, and coefficient block selector 41 for sending an instruction for selecting one of blocks in sequence for performing coefficient update operation to the coefficient correction amount calculation circuit 7c so that the coefficient series in the artificial impulse response register 9 is divided into N blocks for automatically updating the entire coefficient series in a total of M steps.

The echo canceller further includes the first power calculation circuit 42 for finding power $p_l$ ($l=0, 1, \ldots, L-1$) of the coefficients stored in the artificial impulse response register 9, and power comparator 43 for finding the sum of outputs of the power calculation circuit 42 for each block and comparing the sum power $hp_n$ ($n=0, 1, \ldots, N-1$).

An update frequency determination method in each divided block adapted to any sound field characteristics using the comparison results of the power comparator 43 will be described by taking L=2000, N=4, n=2, P=1, and Q=1 as an example.

$$hp0 = p0 + p1 + \ldots + p499$$

$$hp1 = p500 + p501 + \ldots + p999$$

$$hp2 = p1000 + p1001 + \ldots + p1499$$

$$hp3 = p1500 + p1501 + \ldots + p1999 \quad (12)$$

Using the sum power in each block calculated according to expression (12) by the power calculation circuit 42, the power comparator 43 compares the sum power for magnitude. For example, if the comparison results in the relationship like expression (13) of ideal state, $$hp0 > hp1 > hp2 > hp3 \quad (13)$$

the maximum update frequency is given to the first block as a position fixed block where update processing is performed every time. Update frequency is distributed to the second to fourth blocks as position change blocks. The frequency is determined on the basis of the power difference between the blocks. This means that each block power ratio may be provided with a threshold. Expression (13) is determined by comparing the thresholds. Of course, the evaluation is made by the power comparator 43. The evaluation result of the power comparator 43 is transferred to the coefficient series block selector 41 for selecting internally stored divided update block mapping.

An example in which the ideal state as expression (13) does not result is given as expression (14).

$$hp1 > hp2 > hp3 \gg hp0 \quad (14)$$

This relationship represents a state in which a very large initial delay exists. Therefore, the position fixed block is assigned to the second block and update frequency is distributed to other blocks as in expression (13).

Divided update block mapping set according to expression (13) is similar to that shown in FIG. 6, for example. The block mapping may be modeled based on the ratio of direct sound and indirect sound in any sound field and be previously stored in the coefficient series block selector 41. Coefficient correction is made with P position fixed blocks and Q (n-p) position change blocks according to the block mapping adapted to the sound field characteristic.

At the time, the initial positions of the blocks are as desired; the artificial impulse response register 9 may be divided into the first and latter halves for ½ update or the correction may be started with the ideal state in expression (13).

Figure 21:
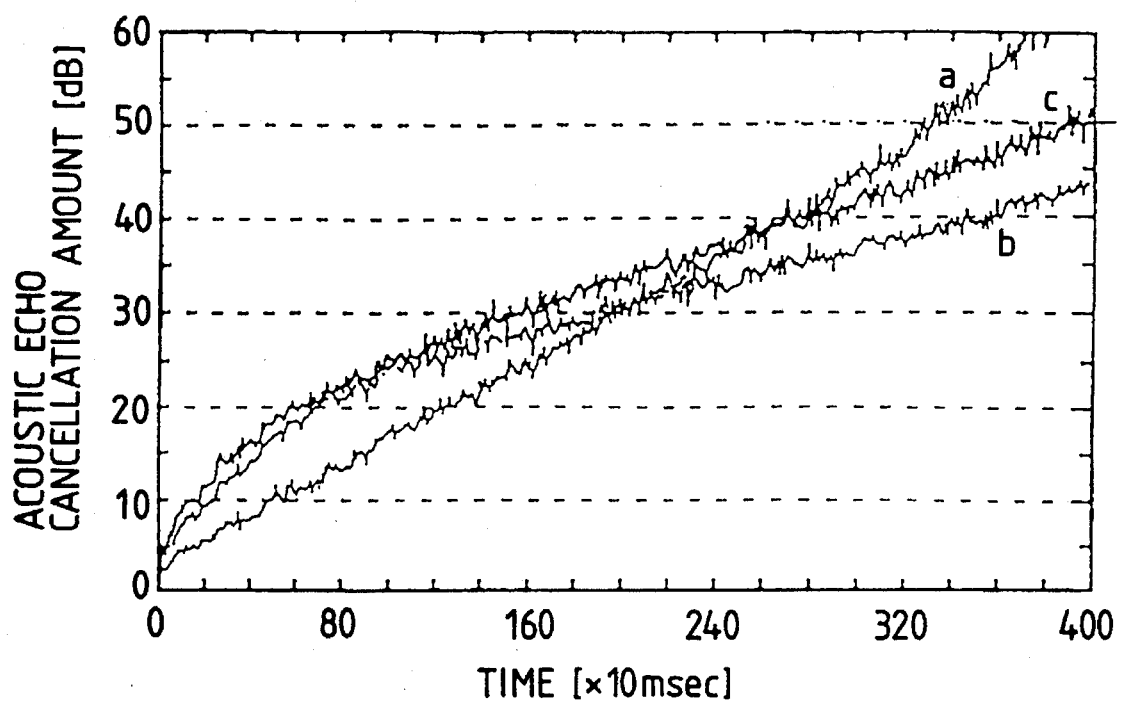
FIG. 21 is a graph showing an example of acoustic echo cancellation characteristics with white noise as a reference input.

FIG. 21 shows acoustic echo cancellation characteristics according to the invention. In the figure, a) is provided by dividing the artificial impulse response register into two blocks and applying update processing to the first and latter halves alternately. b) is provided by applying update processing in the rate of three times for the first block and once for the latter block. c) is provided by applying the system of the invention. At this time, artificial impulse response register count L was 2000 and the signal to near end noise ratio was infinite. To enable high-quality voice communication, about 40 dB is required as acoustic echo cancellation amount (ERLE). Comparing these systems, the a) system and the c) system of the invention are equivalent, but in the b) system, the convergence time is degraded by about 1 sec. As a whole, the c) system is superior to other systems in initial convergence. As the number of divided blocks is increased, the difference between the c) system of the invention and other systems becomes remarkable. Of course, these systems are the same in operation amount.

The echo canceller further includes the second power calculation circuit 44 for finding power pn (n=0, 1, ..., 499) of the coefficient correction amounts generated by the coefficient correction amount calculation circuit 7c, for the position fixed block assigned the highest update frequency (in this case, the first block) among update frequencies adapted to any sound field characteristics determined by the power comparator 43, coefficient divider 45 for dividing each output Δpn (n=0, 1, ..., 499) of the second power calculation circuit 44, by each output pn (n=0, 1, ..., 499) in position fixed block of the first power calculation circuit 42, $$\Delta p0/p0 = R0 \quad (15)$$
$$\Delta p1/p1 = R1$$
$$\vdots$$
$$\Delta p499/p499 = R499$$

and coefficient change detector 46 for comparing the operation result Rn (n=0, 1, ..., 499) of the coefficient divider 45 with a predetermined threshold Sn (n=0, 1, ..., 499).

While the output value Rn (n=0, 1, ..., 499) of the coefficient divider 45 is greater than the threshold S in the coefficient change detector 46, coefficient correction operation processing in the same divided blocks as the position fixed blocks is performed for the position change blocks.

Coefficient correction operation processing is performed as the same divided blocks for the position fixed blocks and the position change blocks, thereby promptly adapting to rapid fluctuation of direct sound. Actually, a rapid change in an impulse response in a sound field is caused by a move of a human body in the vicinity of direct sound or a move of an object associated with it. Therefore, the coefficient series in the position fixed blocks covering portions where power concentration is large is corrected preferentially, thereby improving follow-up performance at acoustic echo path fluctuation.

Figure 22:
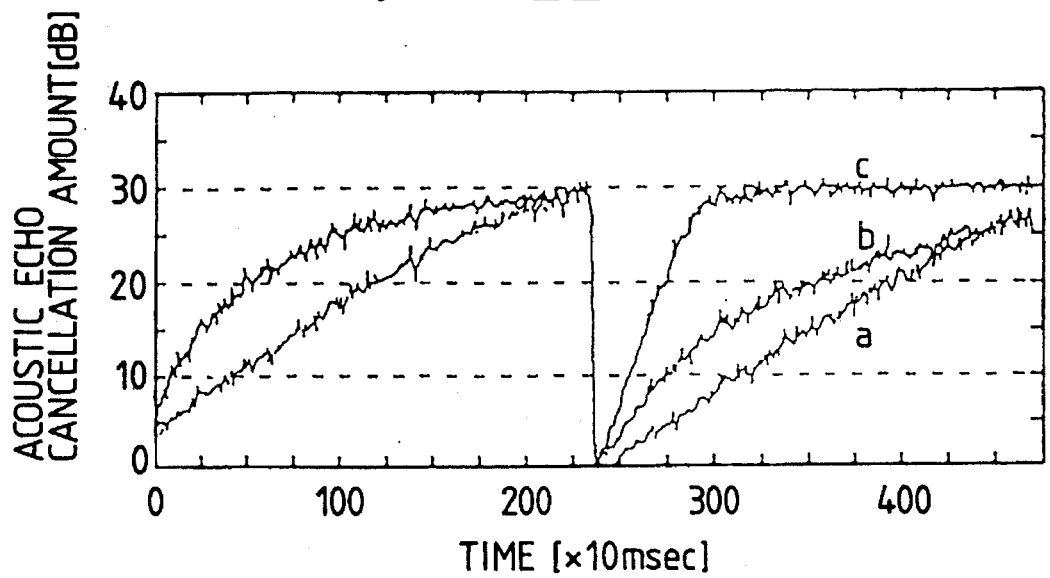
FIG. 22 is a graph showing an example of acoustic echo cancellation characteristics when rapid acoustic echo path fluctuation exists with white noise as a reference input.

FIG. 22 shows acoustic echo cancellation characteristics according to the invention when acoustic echo path fluctuation occurs. In the figure, a) is provided by dividing the artificial impulse response register into two blocks and applying update processing to the first and latter halves alternately. b) is provided according to a first aspect of the invention. c) is provided according to a second aspect of the invention. At this time, artificial impulse response register count L was 2000 and the signal to near end noise ratio was 30 dB for facilitating convergence speed comparison. It is assumed that the path fluctuation was caused by a large and rapid change in direct sound. As seen in FIG. 22, the b) and c) systems differ in convergence speed five times or more after the path fluctuation. This fact also shows that the system of the invention is excellent in adaptive performance to path fluctuation.

As discussed in detail, according to the fourth embodiment of the invention, the following excellent effects can be expected.

(1) Since divided block mapping adapted to any desired sound field characteristics can be performed, degradation of the convergence speed of the acoustic echo cancellation characteristic due to division processing of updating the coefficient correction amount can be corrected and the acoustic echo can be cancelled at a high speed. This is very effective for a loudspeaking voice communication system in which the ratio of direct sound and indirect sound changes easily.

(2) Since the internal operation amount of the adaptive algorithm can be reduced drastically without degrading the acoustic echo cancellation performance and a new training mechanism for estimating any sound field characteristics is not required, the hardware can be provided as a small-scaled configuration and costs can be reduced as compared with the conventional system.

(3) In any sound field characteristics, position fixed blocks, which are divided blocks assigned high update frequencies, are always set in high power concentration portions of impulse response. Thus, even if the number of divided blocks is increased, acoustic echo cancelling processing can be performed without degrading the convergence speed.

(4) Fluctuation of the acoustic echo path characteristic is caused by a move of a human body in a space where direct sound is dominant approaching a microphone or a loudspeaker or a move of an object associated with it. Therefore, in the invention for covering position change blocks as well as position fixed blocks covering the direct sound portion at acoustic echo path fluctuation, the start-up speed of the acoustic echo cancellation characteristic is fast, thus the follow-up characteristic to acoustic echo path fluctuation is very excellent and communication lines can be placed in the stationary state rapidly.

(5) Since amplitude fluctuation of error signal due to erroneous cancellation scarcely occurs, the semi-stationary state is held and remaining echo signal at a comparatively large level does not exist on the communication line, so that high-speed two-way communication detection can be made easily and speech degradation such that the head of transmit voice is cut

What is claimed is:

1. An acoustic echo canceller comprising:

a receive signal input terminal, a receive signal output terminal, a transmit signal input terminal, a transmit signal output terminal, a variable coefficient digital filter comprising an artificial impulse response register processed in N divided coefficient blocks, where N is a positive integer, in response to a receive signal from the receive signal input terminal and for generating an artificial acoustic echo signal, a subtractor located between the transmit signal input terminal and the transmit signal output terminal for subtracting the artificial acoustic echo signal generated by the variable coefficient digital filter from an acoustic echo component of the receive signal input from the receive signal output terminal via an acoustic echo path to the transmit signal input terminal to find a difference signal, a coefficient correction amount calculation circuit, to which the receive signal from the receive signal input terminal and the difference from the subtractor are supplied, for sequentially updating division coefficients so as to minimize the difference signal, a first switch located between the receive signal input terminal and the receive signal output terminal, a second switch located between the transmit signal input terminal and the transmit signal output terminal, the first and second switches being connectable to an associated party terminal, a code generator for generating a code for observing an external acoustic echo characteristic in a state in which the first and second switches are disconnected from the associated party terminal, operation means for calculating the external acoustic echo characteristic when the code is input from the receive signal output terminal via the acoustic echo path to the transmit signal input terminal and for generating an operation result, storage means for storing data, the data stored in the storage means including the operation result generated by the operation means, means, when the first and second switch means are connected to the associated party terminal after a predetermined time has elapsed, for calculating a sum power for each block in response to the data stored in the storage means, means for comparing sum power values between blocks of the artificial impulse response register which are contiguous and for generating a comparison result, and update means for arbitrarily setting an update frequency of each division coefficient in response to the comparison result.

2. The acoustic echo canceller of claim 1, wherein the operation means comprises:

a synchronous adder for calculating an impulse response of the code input from the receive signal output terminal via the acoustic echo path to the transmit signal input terminal, and a convolution integral operation circuit for performing a convolution integral operation on an output of the synchronous adder and the code to calculate an impulse response of the acoustic echo path.

3. An acoustic echo canceller comprising:

a receive signal input terminal, a receive signal output terminal connected to the receive signal input terminal, a transmit signal input terminal, a transmit signal output terminal, a variable coefficient digital filter having an artificial impulse response register divided into N blocks to which a receive signal through the receive signal input terminal is input and for generating an artificial acoustic echo signal, where N represents a positive integer, the impulse response register storing a plurality of coefficients, a coefficient series block selector for selecting n blocks to be updated at a time among a total of N divided blocks of the artificial impulse response register, a subtractor located between the transmit signal input terminal and the transmit signal output terminal for subtracting the artificial acoustic echo signal generated by means of the variable coefficient digital filter from an acoustic echo component of the receive signal input from the receive signal output terminal via an acoustic echo path to the transmit signal input terminal to find a difference signal, a coefficient correction amount calculation circuit, to which the receive signal from the receive signal input terminal and the difference from the subtractor are supplied, for sequentially updating coefficient series so as to minimize the difference signal, a first power calculation circuit for finding a power of each of the plurality of coefficients stored in the impulse response register, and a power comparator for totaling power values for each block output by the first power calculation circuit and comparing the totaled power values, wherein an update frequency of each divided block adapted to a sound field characteristic is determined in response to the comparison result of the power comparator and coefficient correction is executed with P fixed position blocks and Q (n-P) variable position blocks in response to the determined update frequency.

4. The acoustic echo canceller of claim 3, comprising:

a second power calculation circuit for finding a power value of each coefficient correction amount generated by the coefficient correction amount calculation circuit for a fixed position block assigned the highest one of update frequencies adapted to a sound field characteristic according to the power comparator, a coefficient divider for dividing each power value output by the second power calculation circuit by each output of the first power calculation circuit for the fixed position block, and a coefficient change detector for comparing the calculation result given by the coefficient divider with a predetermined threshold, wherein when the output value of the coefficient divider is greater than the threshold in the coefficient change detector, coefficient correction operation processing in the same divided blocks as the fixed position blocks is performed for the variable position blocks.

5. An acoustic echo canceller comprising:

a receive signal input terminal, a receive signal output terminal connected to the receive signal input terminal, a transmit signal input terminal, a transmit signal output terminal, a variable coefficient digital filter for generating an artificial echo signal in response to a receive signal input through the receive signal input terminal, a subtractor located between the transmit signal input terminal and the transmit signal output terminal for finding a difference between an echo signal from the transmit signal input terminal and the artificial echo signal generated by the variable coefficient digital filter, a coefficient correction amount calculation circuit, to which a receive signal from the receive signal input terminal and the difference from the subtractor are supplied, for performing division processing in which a coefficient series of the variable coefficient digital filter is divided into N blocks and the entire coefficient series is automatically updated in M steps, where N and M represent positive integers, and a coefficient series block selector for selecting at least one block to be updated among the N blocks of the coefficient series, wherein a coefficient correction amount fitted to an attenuation characteristic of an impulse response in a sound field is set for the block selected by the coefficient block selector.

6. The acoustic echo canceller of claim 5, wherein the variable coefficient digital filter comprises an artificial impulse response register which stores the coefficient series of the variable coefficient digital filter, and a sum-of-products operation circuit which performs a convolution integral operation on contents of the artificial impulse response register and the receive signal from the receive signal input terminal.

7. The acoustic echo canceller of claim 6, wherein the variable coefficient digital filter further comprises a receive signal input register which stores the receive signal from the receive signal input terminal.

8. An acoustic echo canceller comprising:

a receive signal input terminal, a receive signal output terminal connected to the receive signal input terminal, a transmit signal input terminal, a transmit signal output terminal, a variable coefficient digital filter for generating an artificial echo signal in response to a receive signal input through the receive signal input terminal, a subtractor located between the transmit signal input terminal and the transmit signal output terminal for finding a difference between an echo signal from the transmit signal input terminal and the artificial echo signal generated by the variable coefficient digital filter, a coefficient correction amount calculation circuit, to which the receive signal from the receive signal input terminal and the difference from the subtractor are supplied, for applying a correction amount to a coefficient series of the variable coefficient digital filter, and a coefficient block selector for sending an instruction for selecting one of the blocks in sequence for performing a coefficient update operation to the coefficient correction amount calculation circuit so that the coefficient series of the variable coefficient digital filter is divided into N blocks for automatically updating the entire coefficient series in a total of M steps, where N and M are positive integers, wherein an update frequency is set in each block and wherein a correction loop gain interpolated into the coefficient correction amount calculation circuit is set in response to the update frequency set in each block.

9. The acoustic echo canceller of claim 8, wherein the variable coefficient digital filter comprises an artificial impulse response register which stores the coefficient series of the variable coefficient digital filter, and a sum-of-products operation circuit which performs a convolution integral operation on contents of the artificial impulse response register and the receive signal from the receive signal input terminal.

10. The acoustic echo canceller of claim 9, wherein the variable coefficient digital filter further comprises a receive signal input register which stores the receive signal from the receive signal input terminal.

\* \* \* \* \*